United States Patent [19]

Thornock et al.

[11] Patent Number: 5,038,454
[45] Date of Patent: Aug. 13, 1991

[54] INJECTION BLOW MOLDING PROCESS FOR FORMING A PACKAGE EXHIBITING IMPROVED CHILD RESISTANCE

[75] Inventors: Del M. Thornock, Concord; James R. Goldberg, Novato, both of Calif.; Ronald W. Kock, Wyoming, Ohio; Robert A. Paul, Fairfield, Ohio; Peter W. Hamilton; William Willhite, Jr., both of Cincinnati, Ohio

[73] Assignee: The Procter & Gamble Company, Cincinnati, Ohio

[21] Appl. No.: 499,240

[22] Filed: Mar. 26, 1990

Related U.S. Application Data

[62] Division of Ser. No. 291,926, Dec. 29, 1988, Pat. No. 4,948,002.

[51] Int. Cl.[5] .................. B29C 49/06; B29C 49/64
[52] U.S. Cl. .................... 29/451; 29/450; 29/527.1; 264/521; 264/534; 264/537; 425/525; 425/533
[58] Field of Search ........... 264/521, 537, 538, 535, 264/534, 531, 533, 295; 425/525, 533; 29/450, 451, 527.1, 773

[56] References Cited

U.S. PATENT DOCUMENTS

| Re. 27,673 | 6/1973 | Landen | 215/9 |
|---|---|---|---|
| Re. 29,793 | 10/1978 | Pehr | 222/153 |
| 2,061,214 | 11/1936 | Sentman | 215/9 |
| 2,847,139 | 8/1958 | Christiansson et al. | 215/9 |
| 2,964,207 | 12/1960 | Towns | 215/9 |
| 3,019,931 | 2/1962 | Thornton | 215/9 |
| 3,101,856 | 8/1963 | Whiteman, Jr. | 215/9 |
| 3,110,411 | 11/1963 | Golde | 220/39 |
| 3,172,929 | 3/1965 | Santelli | 264/537 |
| 3,185,333 | 5/1965 | Sharp | 215/82 |
| 3,200,979 | 8/1965 | Powers | 215/9 |
| 3,233,769 | 2/1966 | Jessop | 215/9 |
| 3,306,482 | 2/1967 | Tuuri | 215/9 |
| 3,394,829 | 7/1968 | Peterson | 215/9 |
| 3,399,796 | 9/1968 | Steiner | 215/9 |
| 3,445,022 | 5/1969 | Cilluffo | 215/9 |
| 3,472,409 | 10/1969 | Slack et al. | 215/9 |
| 3,531,008 | 9/1970 | Achabal et al. | 215/9 |
| 3,563,368 | 2/1971 | McHugh | 206/42 |
| 3,567,057 | 3/1971 | Landen | 215/9 |
| 3,593,879 | 7/1971 | Gach | 220/60 |
| 3,627,160 | 12/1971 | Horvath | 215/9 |
| 3,667,637 | 6/1972 | Bagguley et al. | 215/9 |
| 3,700,133 | 10/1972 | Bagguley | 215/9 |
| 3,744,655 | 7/1973 | Nixdorff | 215/9 |
| 3,757,979 | 9/1973 | Berghahn | 215/9 |
| 3,773,203 | 11/1973 | Grimaldi et al. | 215/9 |
| 3,777,924 | 12/1973 | Kayser et al. | 215/9 |
| 3,794,200 | 2/1974 | Marks | 215/9 |
| 3,794,201 | 2/1974 | Galer | 215/9 |
| 3,811,589 | 5/1974 | Thornton et al. | 215/9 |
| 3,826,394 | 7/1974 | Stull | 215/9 |
| 3,830,392 | 8/1974 | Kessler et al. | 215/9 |

(List continued on next page.)

FOREIGN PATENT DOCUMENTS 63-03243  2/1988  Japan .................. 264/537

OTHER PUBLICATIONS

Irwin, "Injection-Blow Molding", Modern Plastics Encyclopedia, 10/1987, pp. 205-206.

Primary Examiner—Jan H. Silbaugh
Assistant Examiner—Catherine Timm
Attorney, Agent, or Firm—E. Kelly Linman; John V. Gorman; Richard C. Witte

[57] ABSTRACT

A method for producing an integral bottle/collar combination for use in a package for storing and dispensing potentially dangerous material such as medicament tablets. The package is resistant to opening by children yet readily openable by adults. The process includes a step of injection molding a polymeric part having a finish portion, a preform portion, and a flange portion. The flange portion has at least one integrally formed socket having a resiliently deformable pushtab connected by a hinge. The preform portion of the injection molded part is blow molded into the shape of the bottle. The hingedly connected pushtab is then folded into its in-use position.

5 Claims, 16 Drawing Sheets

| | | | |
|---|---|---|---|
| 3,848,780 | 11/1974 | Stull | 222/546 |
| 3,865,267 | 2/1975 | Morris | 215/206 |
| 3,870,182 | 3/1975 | Georgi | 215/220 |
| 3,877,597 | 4/1975 | Montgomery et al. | 215/221 |
| 3,881,625 | 5/1975 | Landen | 215/221 |
| 3,882,213 | 5/1975 | Uhlig | 264/535 |
| 3,884,379 | 5/1975 | Landen | 215/221 |
| 3,891,110 | 6/1975 | Gach | 215/216 |
| 3,892,326 | 7/1975 | Schneible | 215/221 |
| 3,894,647 | 7/1975 | Montgomery | 215/9 |
| 3,895,730 | 7/1975 | Koehne et al. | 215/216 |
| 3,900,123 | 8/1975 | Darlington | 215/216 |
| 3,901,400 | 8/1975 | Westfall | 215/221 |
| 3,902,620 | 9/1975 | McIntosh | 215/209 |
| 3,917,097 | 11/1975 | Uhlig | 215/216 |
| 3,954,200 | 5/1976 | Willis | 215/31 |
| 3,968,871 | 7/1976 | Briscoe | 206/1.5 |
| 3,989,152 | 11/1976 | Julian | 215/216 |
| 3,993,208 | 11/1976 | Ostrowsky | 215/216 |
| 3,993,209 | 11/1976 | Julian | 215/216 |
| 4,002,259 | 1/1977 | Geiser | 215/216 |
| 4,036,385 | 7/1977 | Morris | 215/209 |
| 4,061,239 | 12/1977 | Tasseron | 215/221 |
| 4,076,071 | 2/1978 | Rosenkranz et al. | 264/535 |
| 4,079,104 | 3/1978 | Dickson et al. | 264/535 |
| 4,099,639 | 7/1978 | Boxer et al. | 215/209 |
| 4,103,797 | 8/1978 | Morris | 215/209 |
| 4,138,028 | 2/1979 | Price et al. | 215/216 |
| 4,141,461 | 2/1979 | LaChance | 220/253 |
| 4,144,983 | 3/1979 | Pauls et al. | 215/216 |
| 4,149,646 | 4/1979 | Julian | 215/216 |
| 4,154,353 | 5/1979 | Hoo | 215/209 |
| 4,204,615 | 5/1980 | McCarthy | 222/153 |
| 4,223,794 | 9/1980 | Morris | 215/220 |
| 4,261,478 | 4/1981 | Summers | 220/270 |
| 4,280,859 | 7/1981 | Thompson | 264/537 |
| 4,285,437 | 8/1981 | Morris | 215/220 |
| 4,331,247 | 5/1982 | Mumford | 215/216 |
| 4,335,823 | 6/1982 | Montgomery et al. | 215/206 |
| 4,337,869 | 7/1982 | Guinle | 215/201 |
| 4,353,473 | 10/1982 | Morris | 215/220 |
| 4,357,296 | 11/1982 | Hafele | 264/537 |
| 4,520,921 | 6/1985 | Vissing | 206/1.5 |
| 4,604,044 | 8/1986 | Hafele | 264/537 |
| 4,629,598 | 12/1986 | Thompson | 264/537 |
| 4,690,292 | 9/1987 | Henning | 215/201 |
| 4,782,965 | 11/1988 | Wassilieff | 215/220 |
| 4,782,966 | 11/1988 | Thackrey | 215/230 |

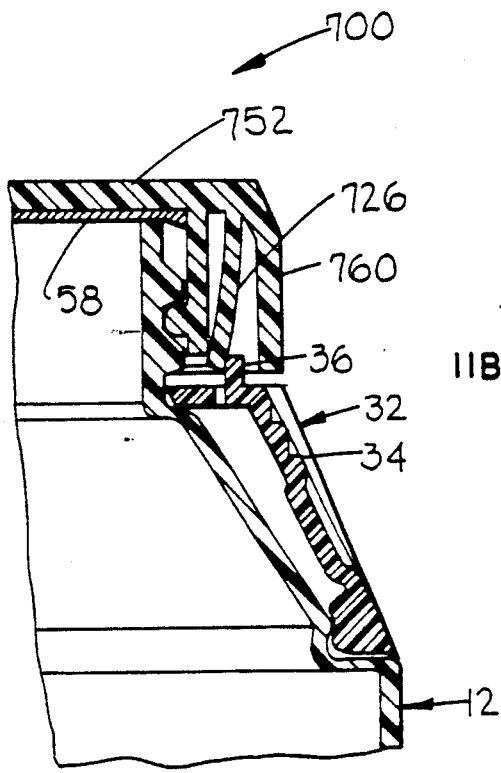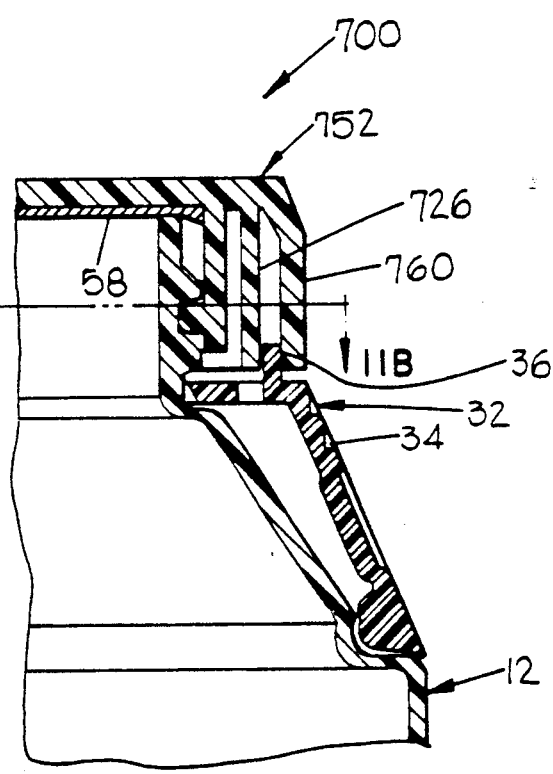
Fig. 11A  Fig. 11
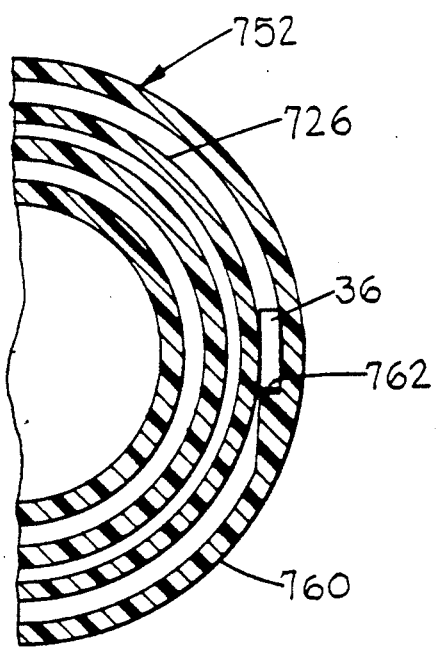
Fig. 11B

INJECTION BLOW MOLDING PROCESS FOR FORMING A PACKAGE EXHIBITING IMPROVED CHILD RESISTANCE

This is a division of application Ser. No. 291,926 filed on Dec. 29, 1988, and issued as U.S. Pat. No. 4,948,002 on Aug. 14, 1990.

TECHNICAL FIELD

The present invention has relation to a package for storing and dispensing materials which can be harmful, particularly if improperly ingested. Such materials may be in solid, tablet, granular, powdered, semi-solid paste or liquid form.

In a particularly preferred embodiment, the present invention has relation to a package for storing and dispensing medicaments, such as analgesic tablets or the like.

The present invention has further relation to such a package which is resistant to opening by the majority of children coming in contact with it, yet which can be opened without undo difficulty by adults whose manual dexterity may, at least to a degree, be impaired.

The present invention has further relation to such a package which can be inexpensively manufactured to facilitate disposal thereof once the contents have been completely dispensed from the package.

The present invention has still further relation to method and apparatus for manufacturing such a package.

BACKGROUND ART

Child resistant packaging is known for being both a blessing and a curse. It is a great concept for preventing children from opening potentially dangerous materials such as medications, but for adults, especially the elderly, such packaging can be a nuisance.

Because of deteriorating health, the elderly tend to rely on medication more than the average person. However, simply making medication more easily accessible to the elderly bears with it the risk that the contents of the package could be accessible to children who could be seriously injured if they obtain access to the contents of a medicament package and ingest the medicaments contained therein.

The aforementioned problems are recognized generally in the packaging industry, particularly the pharmaceutical industry. Numerous articles have been written on the subject. See for example "The Dual Vial" published in the Fall 1988 edition of Stout magazine Attempts to deal with these problems are also reflected in the patent literature. For example, U.S. Pat. No. 3,993,208 issued to Ostrowsky on Nov. 23, 1976 discloses a safety closure means wherein the shoulder on a container is formed with a pair of diametrically positioned locking lugs. The mating closure is formed of thermoplastic material and has a top end wall and a depending annular inner wall in addition to a depending outer annual skirt spaced from the inner wall. The inner wall includes threaded means for engaging the neck of the container to secure the cap to the container in a closed position. The outer skirt of the cap has a pair of diametrically positioned radially extending locking lugs adjacent the lower end of the skirt. The cap locking lugs are adapted to pass inwardly of the container locking lugs and to be compressed radially inwardly when the cap is rotated to a cap closing position. As the cap lugs move past the container locking lugs, the cap lugs are released from their compressed state so that they extend outwardly beyond the engaging edges of the container locking lugs. This prevents the closure from being unscrewed until the outer skirt of the closure is manually squeezed radially inwardly adjacent the cap locking lugs to permit them to clear engagement with the edges of the container lugs as the cap is unscrewed from the container.

Under normal in use conditions, removal of the closure of Ostrowsky requires squeezing the outer skirt of the closure sufficiently to disengage the lugs on the container and simultaneously unscrewing the closure with the same hand used to apply the squeezing force. This may be difficult, particularly for elderly individuals who may have impaired manual dexterity in their fingers.

In addition, the closure of Ostrowsky visually reveals how the interlocks must be overcome in order to remove the closure. A child having sufficient strength to depress the closure skirt may have sufficient intellect to defeat the interlock and remove the closure.

Another prior art attempt to overcome the aforementioned problems is disclosed in U.S. Pat. No. 4,520,921 issued to Vissing on June 4, 1985. The Vissing patent discloses a semi-rigid type container having a cap portion with a special mating relationship In the illustrated embodiment, the cap comprises a cylindrical portion with an enlarged upper edge to facilitate gripping. A hole, or a pair of holes, may be provided in the skirt of the cap. The mating container to which the cap is applied has a reduced thickness area with a protruding boss or a pair of bosses. The reduced thickness portion of the container deforms when pressure is applied to the pressure point so that the cap can slip over the container. When pressure is released from the pressure point the boss or bosses on the container are allowed to enter the mating hole or holes in the cap. If desired a tapered lead-in ramp can be used to seat the boss on the container in a mating hole in the cap. The cap is removed by squeezing the pressure point or points to disengage the boss or bosses on the container from the hole or holes in the cap.

A potential difficulty, from the standpoint of child resistance, is that a simple squeezing force applied about the periphery of the container could inadvertently lead to deformation of the pressure point or pressure points of the container of Vissing, thereby permitting complete removal of the cap without the need for deliberate action on the part of the person squeezing the container.

OBJECTS OF THE INVENTION

Accordingly, it is an object of the present invention to provide an improved package which is resistant to opening by the majority of children coming into contact with the package, but which at the same time can readily be removed by adults who may have impaired manual dexterity in their fingers due to conditions such as advancing age, arthritis, etc.

It is another object of the present invention to provide such a package which can be inexpensively manufactured to permit disposal thereof when its contents have been fully consumed.

It is another object of the present invention to provide such a package which, in a particularly preferred embodiment, conveys an audible signal to the user that the package has been fully reclosed and again rendered child resistant for the next dispensing cycle.

It is still another object of the present invention to provide method and apparatus for producing such packages.

It is still another object of the present invention to provide method and apparatus for producing such packages wherein the bottle portion of said package incorporates an integral locking feature which can be reliably molded along with the bottle as a single piece.

DISCLOSURE OF THE INVENTION

In a particularly preferred embodiment, the present invention comprises a package for dispensing potentially dangerous materials, such as medicaments, e.g., analgesic tablets or the like. The package preferably comprises a bottle, a collar which snap fits onto the uppermost portion of the bottle and a screw-on closure. The collar preferably includes a pair of spring-like pushtabs which include vertical extensions at their uppermost ends. The closure has a skirt which includes a pair of interlocking teeth which resist unscrewing of the closure once the closure has been completely applied to the bottle unless the opposed pushtabs on the collar are depressed so as to disengage their vertical extensions from the interlocking teeth on the innermost surface of the closure skirt.

Preferred method and apparatus for fabricating packages of the present invention, including method and apparatus for molding the bottle and collar as a single piece are also provided.

Packages of the present invention are relatively easy to open for adults because the opposing pushtabs on the collar are normally squeezed between the thumb and index finger of one hand while a twisting motion is applied to unscrew the closure with the other hand. Because each pushtab must be depressed before an attempt is made to unscrew the closure, it is unlikely that a child merely grasping the collar about its periphery will concurrently disengage the vertical extensions of both pushtabs from the interlocking teeth on the closure skirt at the same time he or she exerts the required unscrewing torque with the other hand.

It is therefore believed that packages of the present invention strike an optimum balance between child resistance and accessibility by adults who may have impaired manual dexterity, particularly of their fingers.

In addition, it is believed that particularly preferred packages of the present invention are less likely to be left in a non-child resistant condition after their initial opening, since they provide audible confirmation to the user when the closure is reapplied to the container to a degree sufficient to re-establish child resistance for the next dispensing cycle.

BRIEF DESCRIPTION OF THE DRAWINGS

While the specification concludes with claims particularly pointing out and distinctly claiming the present invention, it is believed the present invention will be better understood from the following description in conjunction with the accompanying drawings in which:

FIG. 11 is a simplified partial cross-section of still another package of the present invention;

FIG. 11A is a simplified partial cross-sectional view generally similar to that of FIG. 11, but showing the condition of the intermediate skirt in the closure when the pushtab has been depressed;

FIG. 11B is a partial cross-section taken along section line 11B—11B of FIG. 11 showing the position of the pushtab extension between the intermediate and outer closure skirts once the closure has been finally assembled onto the bottle;

DETAILED DESCRIPTION OF THE INVENTION

Figure 1:
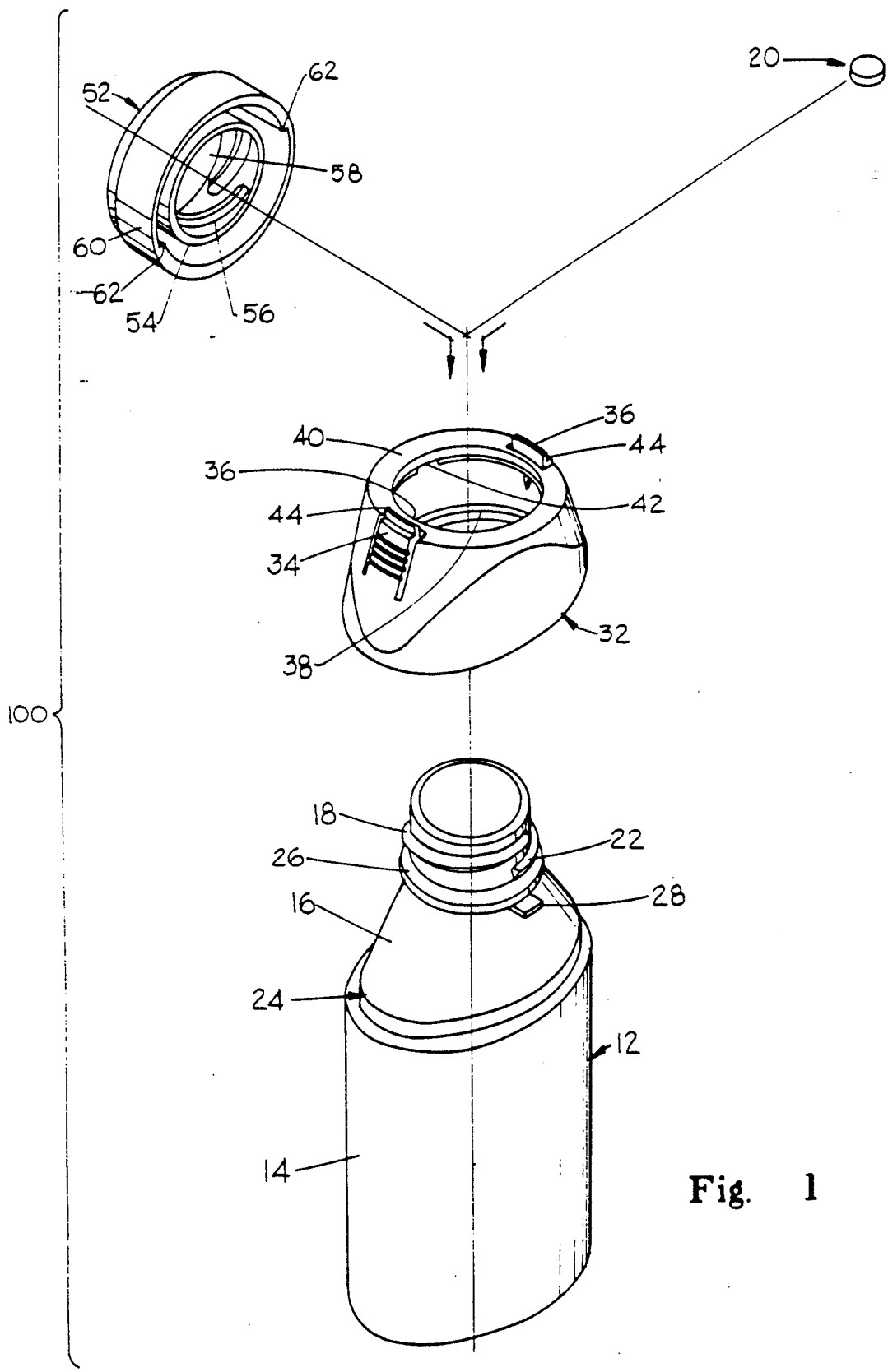
FIG. 1 is an exploded simplified perspective view of a particularly preferred package of the present invention.

FIG. 1 shows an exploded view of a preferred child resistant package 100 of the present invention. Package 100 is particularly well suited for housing medicaments, such as analgesic tablets 20. However, advantageous use of packages of the present invention is in no way limited to the field of medicaments or even to tablets. Packages of the present invention may be used for storing and dispensing nearly any potentially dangerous material whether in solid, tablet, granular, powdered, semi-solid, paste or liquid form. The accompanying description in the context of a medicament tablet package is merely to facilitate a complete understanding of particularly preferred embodiments of the present invention.

FIG. 1 shows a bottle 12, which is preferably made of polyethylene, the most common and inexpensive analgesic bottle material. The bottle 12 is preferably injection blow molded with a wall thickness in the range of about 0.015 inches to about 0.050 inches. The particular bottle 12 shown in FIG. 1 has a base 14 with a substantially constant elliptical cross-section. In a particularly preferred embodiment the ratio of ellipse minor dimension to major dimension is approximately 0.7.

The upper shoulder portion 16 of the bottle 12 is preferably an elliptical cone in shape. The cone included angles of upper shoulder portion 16 preferably range between about 36° and about 70°, as measured about the periphery of the bottle 12. In a particularly preferred exemplary embodiment, the base 14 exhibits a major axis of about 1.75 inches, a minor axis of about 1.25 inches and an overall height of about 1.12 inches. The altitude of the truncated cone of shoulder portion 16 is about 0.75 inches in this exemplary embodiment.

Above the shoulder portion 16 of bottle 12 is a cylindrical finish portion 18, which is, in the aforementioned exemplary embodiment, about 0.5 inches in height. The three portions, base portion 14, shoulder portion 16, and finish portion 18 of bottle 12 are preferably concentrically aligned on a common vertical axis.

The internal diameter of finish 18 is a function of the diameter (or other major dimension if non-round) of tablet 20 and the fill rate of tablets. In particular, the inside diameter of finish 18 should be sufficiently large that bridging of tablets 20, entering the finish 18 from a tapered filling chute, is minimized. Once the inside diameter of finish 18 has been selected, the diameter of the uppermost end of the truncated cone comprising shoulder portion 16 is determined, i.e., it is substantially equal the inside diameter of finish 18. The included cone angles selected for shoulder portion 16 then determine the major and minor axis dimensions of base portion 14. For analgesic tablets 20 having a diameter of about 0.375 inches, the major axis dimension of base portion 14 typically is in the range of about 1.5 inches to about 2.5 inches. The height of base portion 14 is selected to provide whatever overflow volume is desired in the package 100.

While any suitable means, e.g., a combination of lugs and screw threads, can be employed to rotatably and releasably secure closure 52 to the finish portion 18 of bottle 12, complementary threads are particularly preferred.

The threads 22 on finish 18 are preferably double lead threads, each with a lead angle which provides a thread pitch of about 0.1 inches to about 0.13 inches per half revolution.

Indented recess 24 located at the base of shoulder portion 16 of bottle 12 and outwardly projecting ring 26 located at the uppermost end of shoulder portion 16 of bottle 12 are intended to provide snap-fit attachment of collar 32, also shown in FIG. 1. As will be described in greater detail in the following paragraphs, anti-rotation lugs 28 extending from shoulder portion 16 of bottle 12, just below outwardly projecting ring 26, are intended to interlock with collar 32 in order to prevent rotation of collar 32 relative to bottle 12 when removal torque is applied to the closure 52.

Collar 32 is preferably an injection molded part having an outside shape of a truncated cone intersecting an elliptical cylinder of the same shape as base 14 of bottle 12. Collar 32 is preferably made of a polymer which has an adequate bending modulus to provide a pair of resiliently deformable spring-like pushtabs 34. In the embodiment shown in FIG. 1, spring-like pushtabs 34 are molded so that they are cantilevered at their base in their at rest position in the opposing conical sides of collar 32. Preferably they have a thickness substantially equal to that of the walls of collar 32, e.g., between about 0.040 inches and about 0.060 inches.

The top of each spring-like pushtab 34 has a vertical extension 36 which projects above the top edge of collar 32. The pushtab vertical extensions 36 interlock with teeth 62 on the innermost surface of the outer skirt 60 of closure 52 when the closure 52 is fully threaded onto the finish portion 18 of bottle 12.

During assembly the pushtab vertical extensions 36 preferably produce an audible "click" when the teeth 62 on skirt 60 of closure 52 pass by, thereby signaling the user that the package has been restored to a child resistant condition for the next dispensing cycle.

In order to unscrew closure 52 from finish portion 18 once the closure has been fully assembled onto the finish portion 18 of bottle 12, both pushtabs 34 must be depressed such that the pushtab vertical extensions 36 disengage the closure teeth 62 located on the innermost surface of closure skirt 60. The squeezing force required to depress pushtabs 34 is preferably great enough to be difficult for a child, yet low enough that people using the medication, such as arthritics, can readily depress the opposing pushtabs 34 while concurrently applying an unscrewing force to the closure 52. The preferred squeezing force for the pushtabs is believed to be in the range of about 0.5 pounds and about 5 pounds.

In addition, pushtabs 34 are preferably substantially flush with the outermost surface of collar 32 so that simply grasping the collar about its entire periphery is unlikely to permit vertical extensions 36 of pushtabs 34 from becoming inadvertently disengaged from closure teeth 62. Rather, a conscious decision to squeeze the opposing pushtabs must be made by the user to initiate the opening process. This minimizes the chance that a child will be able to remove closure 52 simply by squeezing the entire periphery of collar 32 in his or her hand while trying to unscrew closure 52.

To ensure that package 12 will remain functional until all of its contents have been dispensed, the thickness and length of spring-like pushtabs 34 should be such that bending stresses resulting from the deflection necessary to disengage pushtab vertical extensions 36 from closure teeth 62 remain below the yield strength of the polymer comprising collar 32. Materials such as polypropylene have bending modulii and yield strengths which normally can provide squeeze forces on the lower end of the aforementioned force range, while materials such as acrilonitrile-butadiene-styrene (commonly referred to as "ABS") can be used to provide squeeze forces on the upper end of the aforementioned force range.

Figure 4:
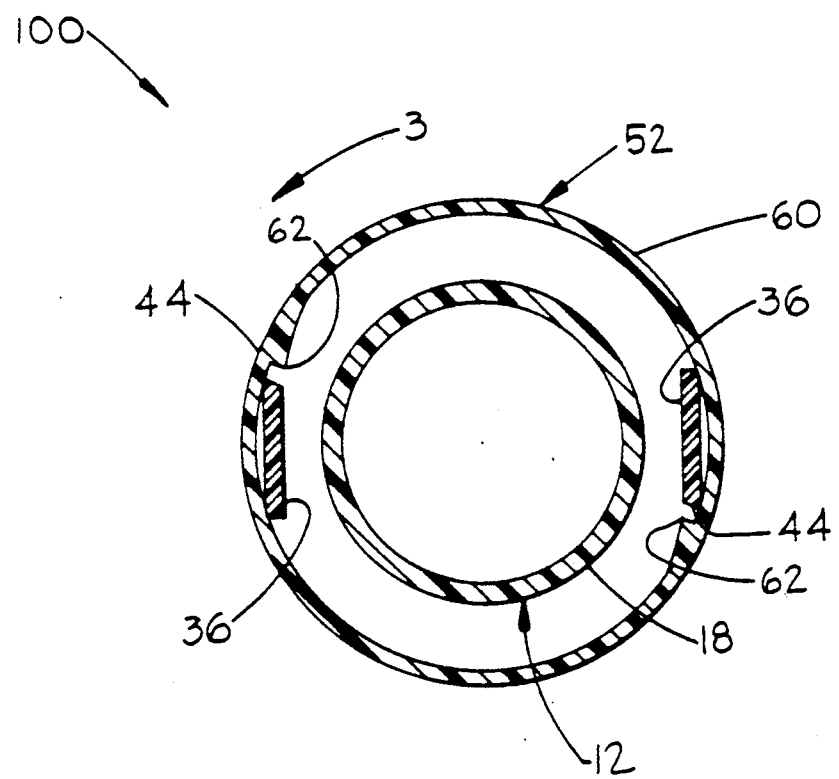
FIG. 4 is a simplified cross-section of the package of FIG. 2 taken through section line 4—4 of FIG. 2.

As can best be seen in FIG. 4, the edge 44 of each pushtab extension 36 interlocks with one of the closure teeth 62 to prevent the closure 52 from being unscrewed unless both of the spring-like pushtabs 34 are depressed. These two surfaces contact in such a way that torque applied in a direction to unscrew closure 52 (direction of arrow 3) will cause pushtab extensions 36 to be pulled outward against the inner surface of skirt 60 unless the pushtabs 34 have been depressed prior to applying the unscrewing torque. This feature enhances the child resistance of package 100, since it prevents high closure removal torque alone from causing pushtab extensions 36 to become disengaged from closure teeth 62.

Figure 2:
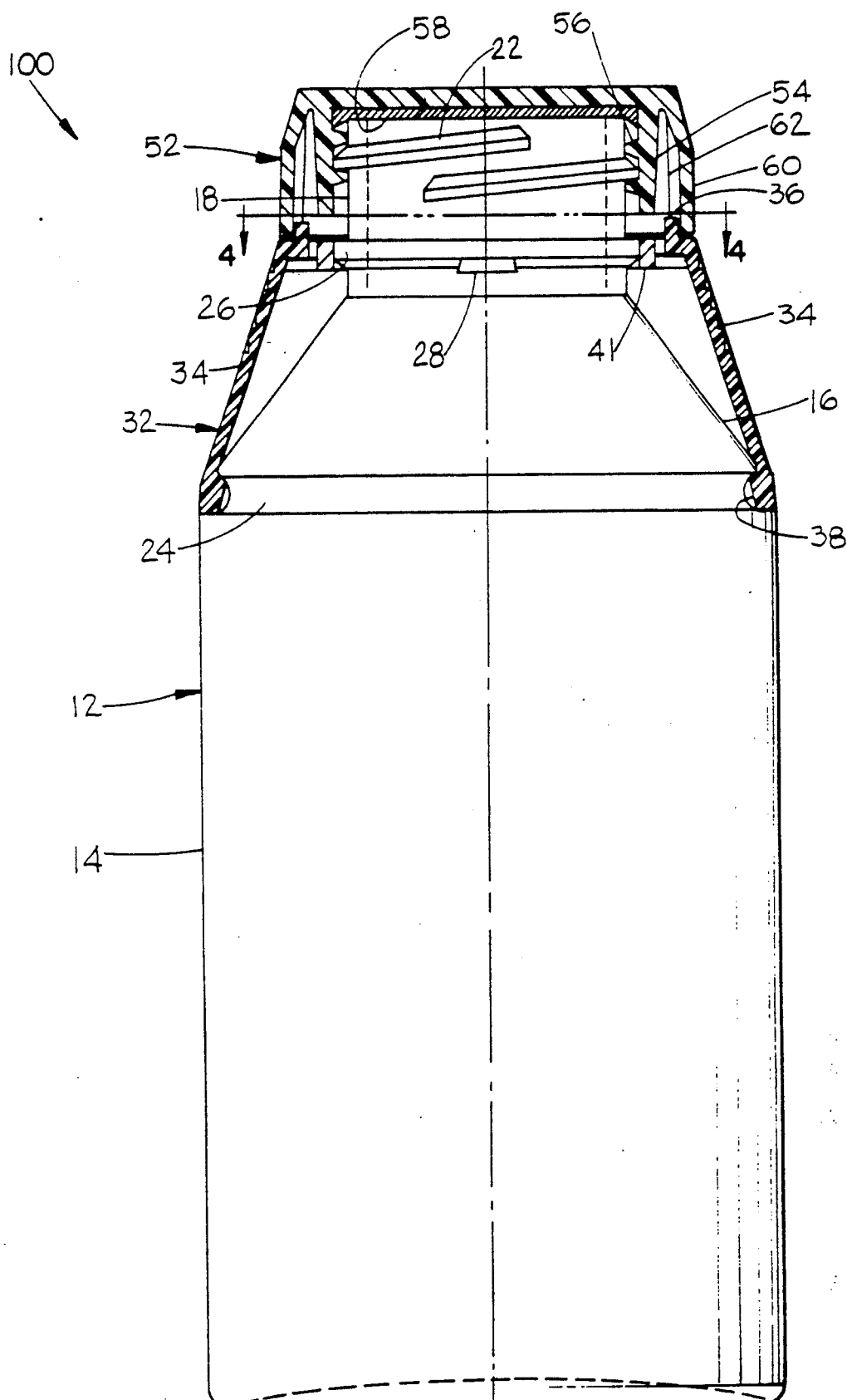
FIG. 2 is a simplified cross-sectional view of the package generally shown in FIG. 1 after the package has been assembled, said view being taken at a point which is perpendicular to anti-rotation lugs 28 on bottle 12.
Figure 3:
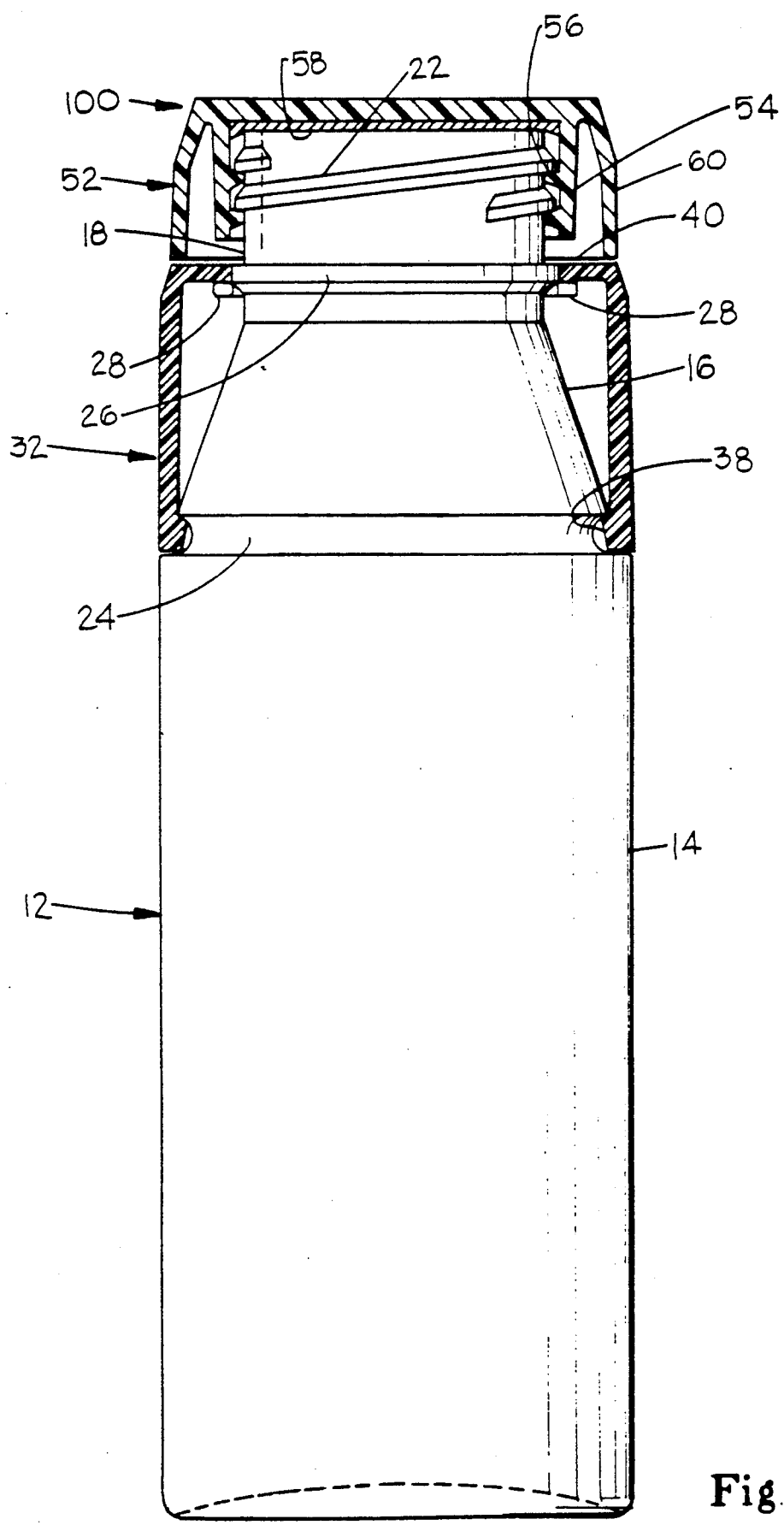
FIG. 3 is a simplified cross-section generally similar to that of FIG. 2, but showing the cross-section through anti-rotation lugs 28 on bottle 12.

As can best be seen in FIGS. 2 and 3, collar 32 has an inwardly projecting ring 38 on its lowermost inner surface and an inwardly projecting ring 40 on its uppermost inner surface. Inwardly projecting ring 40 further includes an inwardly projecting lip 41 on its lowermost surface. Ring 38 of collar 32 snap-fits into recess 24 of bottle 12 and ring 40 with inwardly projecting lip 41 snaps over outwardly projecting ring 26 of bottle 12, as generally shown in FIGS. 2 and 3. A recess 42 on opposing sides of ring 40 of collar 32 mates with anti-rotation lugs 28 on shoulder portion 16 of bottle 12 to prevent rotation of collar 32 on bottle 12, as discussed earlier, once the collar has been snapped into place on bottle 12.

Closure 52 shown in FIG. 1 preferably has an outer skirt 60 which has the same outside diameter as the top of the truncated cone surface of collar 32. The two teeth 62 projecting from the inside of skirt 60 are preferably 180° from each other. The teeth 62 preferably have gentle ramps that cam the vertical extensions 36 of the spring-like pushtabs 34 inward when the closure 52 is being screwed onto the finish portion 18 of bottle 12, but sharp edges that interlock with the pushtab vertical extensions 36 once the closure 52 has been fully assembled onto the bottle 12 and is thereafter twisted in the direction of removal.

Outer skirt 60 of closure 52 preferably has its inner bottom edge beveled, as shown in FIG. 2, to act as a lead-in when skirt 60 first contacts the top of the vertical extensions 36 of spring-like pushtabs 34 during closure installation. A second skirt 54 of closure 52, inside of skirt 60, has internal threads 56 which are complementary to external threads 22 on the finish portion 18 of bottle 12.

The double skirted closure design permits the use of a relatively wide, annular, inwardly projecting ring 40 at the top of collar 32. This relatively wide annular ring 40 provides rigidity to collar 32 such that it can be readily snap-fit onto bottle 12.

The closure 52 is preferably made of polypropylene for good frictional properties between the internal closure threads 56 and the preferred polyethylene exterior threads 22 o finish portion 18 of bottle 12. Inside closure 52 there is preferably provided a cardboard or other suitable liner 58, which seals against the top of the finish portion 18 of bottle 12 when the closure 52 is installed on the bottle. Because of the variation in thickness and compressibility of liner 58, the location of teeth 62 relative to the start of internal closure threads 56 is preferably such that teeth 62 pass beyond the vertical extensions 36 of spring-like pushtabs 34 somewhat when closure 52 is fully assembled onto the bottle. This minimizes the need for tight tolerances on mating parts.

The relationships of the mating parts of package 100 are best shown in FIGS. 2 and 3, which are vertical cross-sectional views of the bottle 12, collar 32, and closure 52 in their fully assembled condition. The cross-section of FIG. 3 is taken at 90° to the cross-section of FIG. 2 to better show anti-rotation lugs 28.

FIG. 4 is a sectional view, taken along section line 4—4 of FIG. 2, which better shows how the teeth 62 on skirt 60 of closure 52 interlock with the vertical extensions 36 of spring-like pushtabs 34 once the closure has been fully installed on the bottle.

Figure 5:
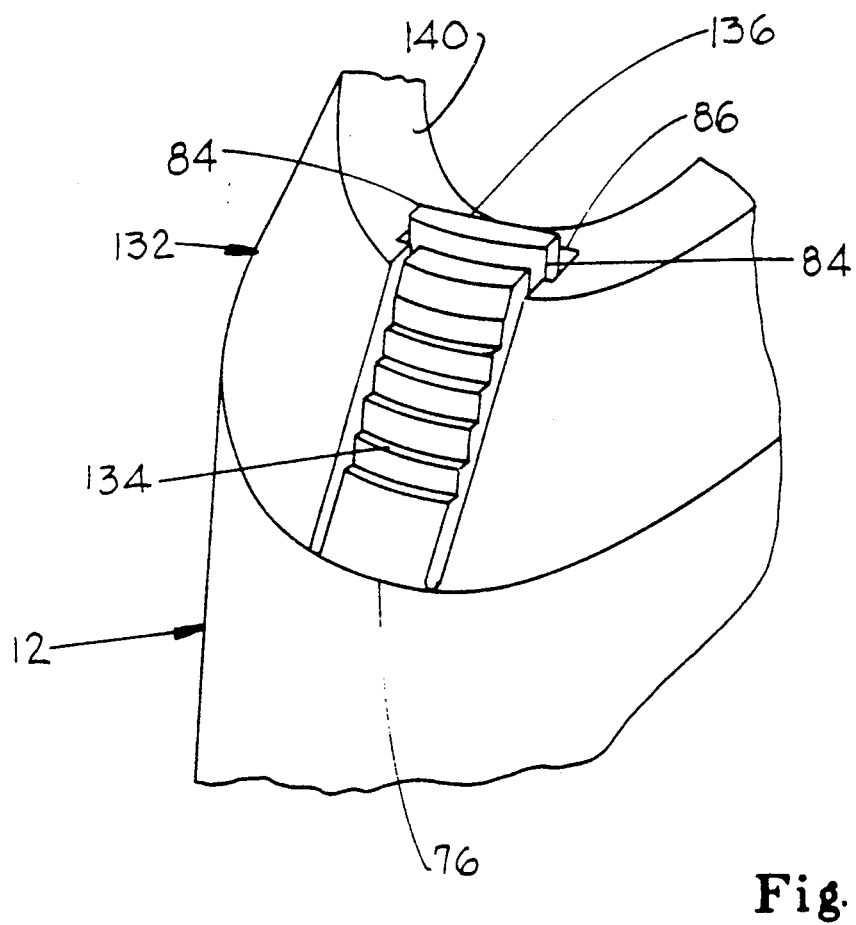
FIG. 5 is a simplified partial perspective view of an alternative package of the present invention.

Another preferred package embodiment 200 of the present invention, which uses the same closure 52 and bottle 12 as the preferred package embodiment 100 shown in FIG. 1, is shown in the simplified partial view of FIG. 5. Only the collar 132 of package 200 is different.

Figure 5A:
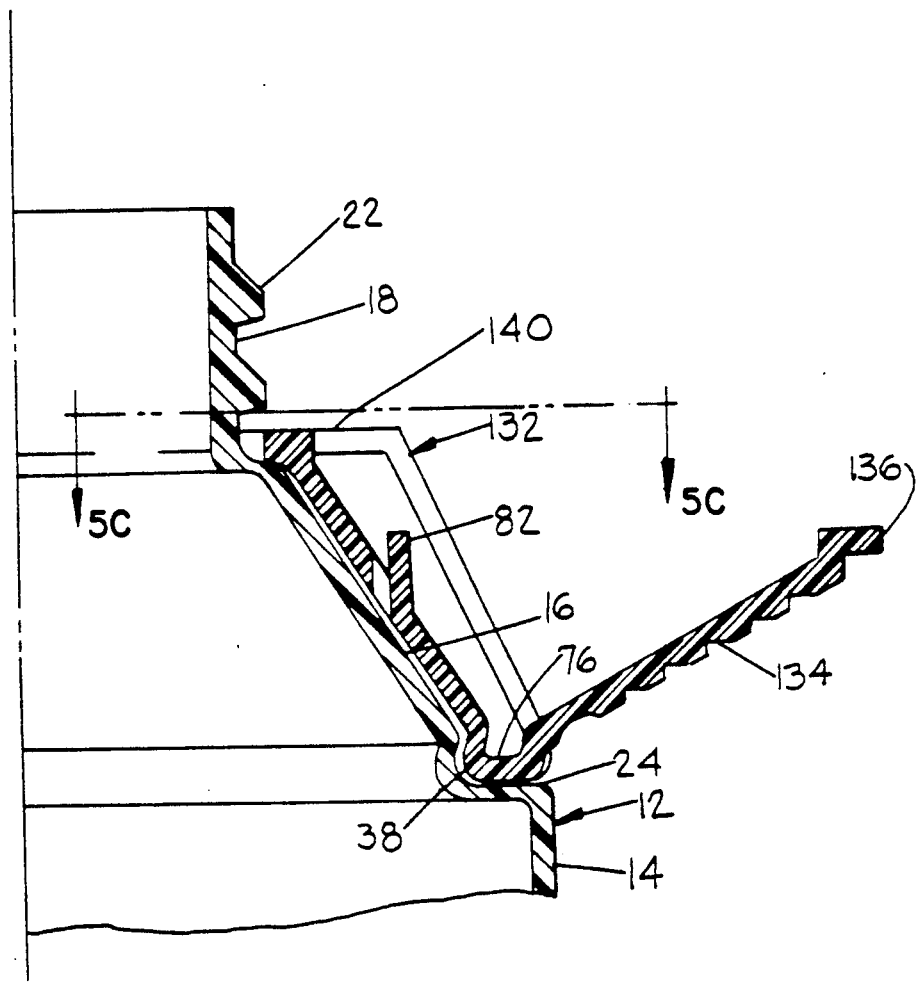
FIG. 5A is a simplified cross-sectional view of the package generally shown in FIG. 5 prior to folding of the pushtab into its in-use position.

FIG. 5 shows a collar 132, which snap-fits onto a bottle 12 just like collar 32. The difference between collar 132 and collar 32 is in the pushtab design. Collar 132 has two pushtabs 134 which are connected to the collar 132 at their lowermost ends by means of hinges 76. By using a hinge 76, each pushtab 134 can be injection molded in an outwardly extending position, as generally shown in FIG. 5A. If the collar 132 is comprised of a material such as polypropylene, for example, each pushtab 134 can be physically manipulated from its as molded position, as shown in FIG. 5A, to its in-use position, as generally shown in FIG. 5B, without overstressing the material comprising hinge 76.

Figure 5B:
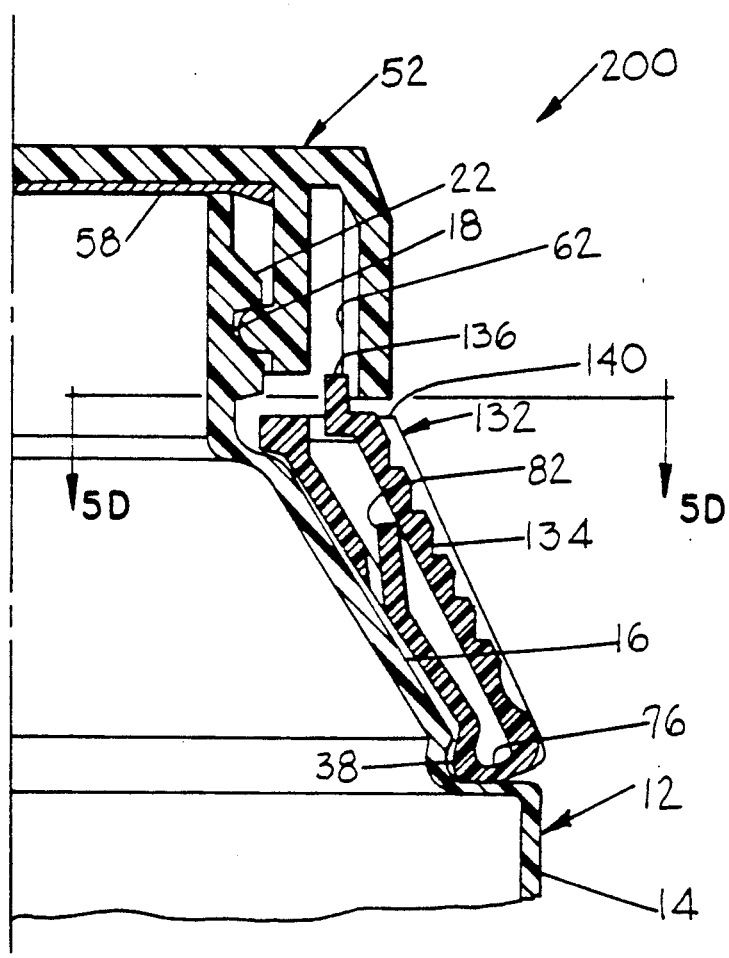
FIG. 5B is a view generally similar to that of FIG. 5A, but showing the pushtab after it has been folded into its in-use position.
Figure 5C:
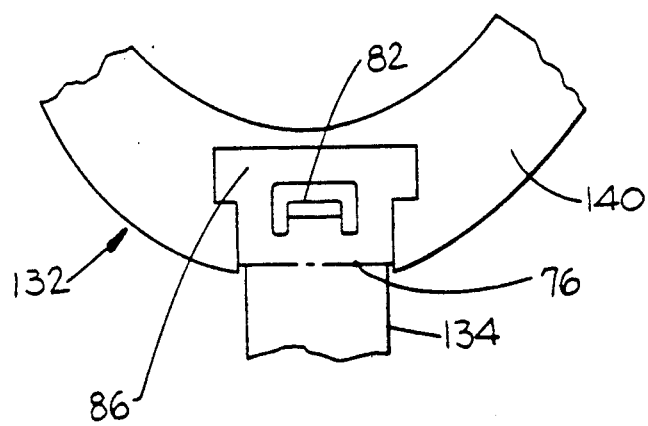
FIG. 5C is a partial plan view of the package shown in FIG. 5A taken along view line 5C—5C of FIG. 5A.

Because such a hinged arrangement of pushtabs 134 provides substantially no resistance to inward movement of pushtabs 134, a separate pushtab return spring, such as beam spring 82 extending from collar 132, is preferably molded into the truncated core portion of collar 132, as generally shown in FIGS. 5B and 5C.

Figure 5D:
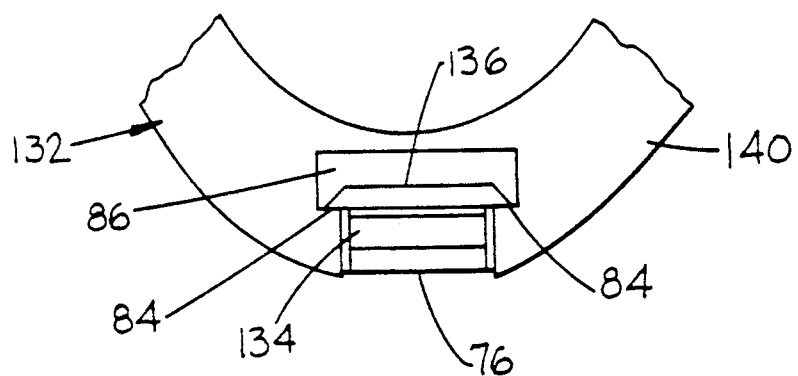
FIG. 5D is a view generally similar to that of FIG. 5C, but showing the condition of the pushtab after it has been folded into its in-use position, said view being taken along view line 5D—5D of FIG. 5B.

Since there is no restraint to prevent outward movement of pushtabs 134 when closure 52 is removed, locking projections 84 are preferably molded into the sides of pushtabs 134 and vertical extensions 136, as generally shown in FIG. 5D. These locking projections 84 are preferably tapered so they can be readily pressed into a socket 86 which is preferably integrally molded into the uppermost annular ring 140 of collar 132. Once inserted into socket 86, locking projections 84 engage the sides of socket 86 to prevent the pushtabs 134 and vertical extensions 136 from moving outward beyond their in-use position, as generally shown in FIGS. 5 and 5D.

As noted in the preceding paragraphs, beam spring 82 is preferably integrally molded with collar 132 so that a simple injection mold can be used to make the entire collar 132, i.e., the mold halves can be axially separated from one another to release the fully molded collar 132. Pushtabs 134 are molded in an outwardly extending position and subsequently folded to their in-use position to simplify the molding operation.

Figure 6:
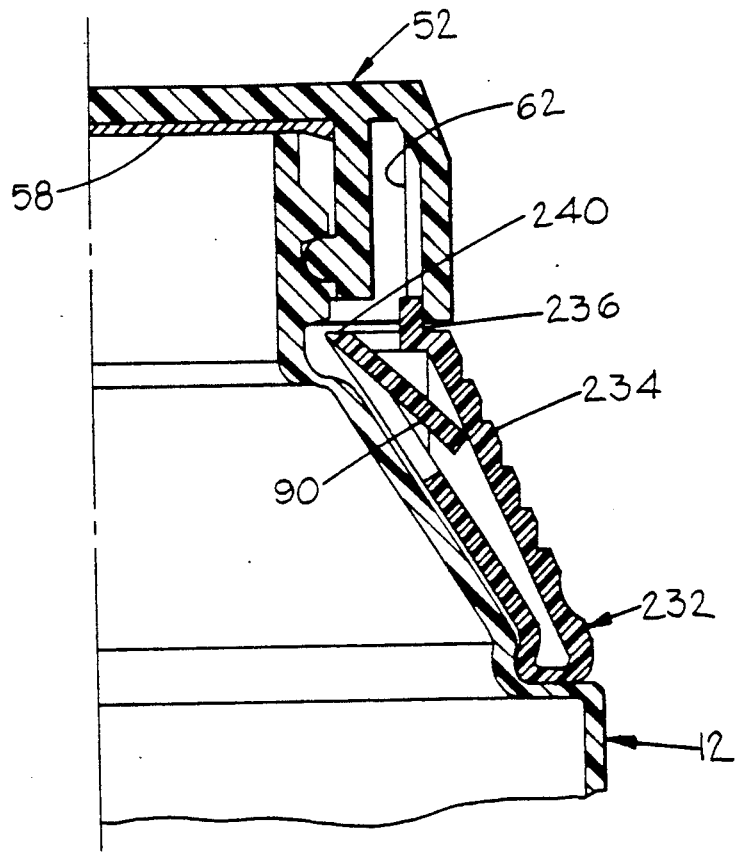
FIG. 6 is a simplified partial cross-section of an alternative package of the present invention.
Figure 7:
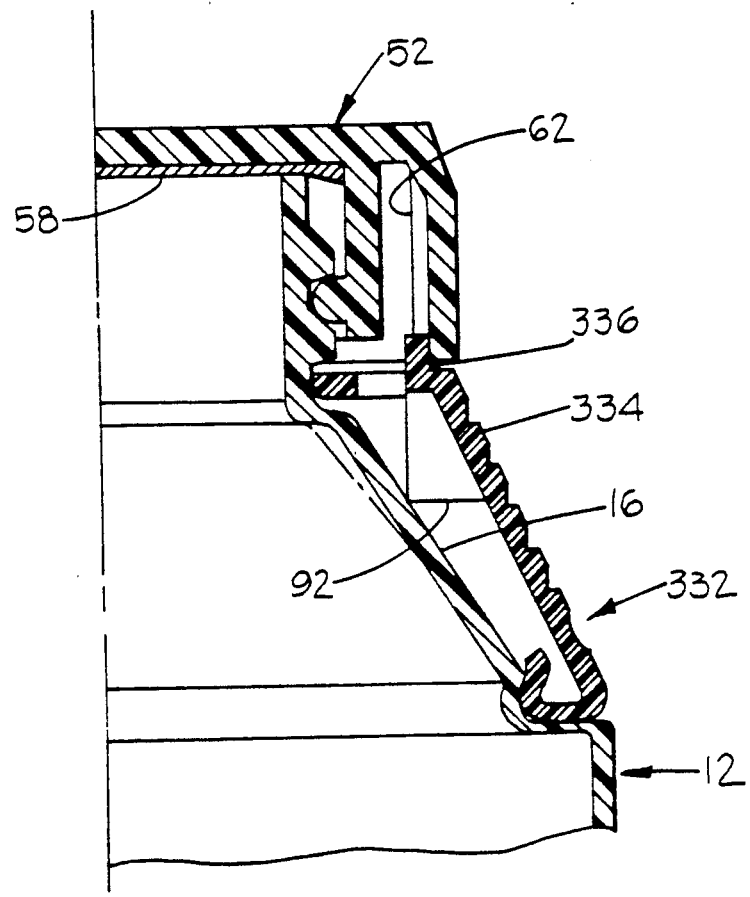
FIG. 7 is a simplified partial cross-section of another package of the present invention.

FIGS. 6 and 7 show alternative constructions for the hinged pushtabs and pushtab return springs. In particular, FIG. 6 shows a beam spring 90 cantilevered outwardly and downwardly from upper annular ring 240 of an otherwise identical collar 232. Collar 232 has a resiliently deformable pushtab 234 having a vertical extension 236. Squeezing forces applied to resiliently deformable pushtab 234 are resisted by beam spring 90. FIG. 7, on the other hand, shows a resiliently deformable pushtab 334 having a vertical extension 336. Pushtab 334 has a substantially rigid lug 92 integrally molded on its innermost surface. Lug 92 is designed to deform the sidewall of the conical shoulder portion 16 of bottle 12 (see dotted line in FIG. 7) when pushtab 334 is depressed. The sidewall resilience of conical shoulder portion 16 of bottle 12 helps provide resistance to depression to resiliently deformable pushtabs 334 of collar 332.

Figure 8:
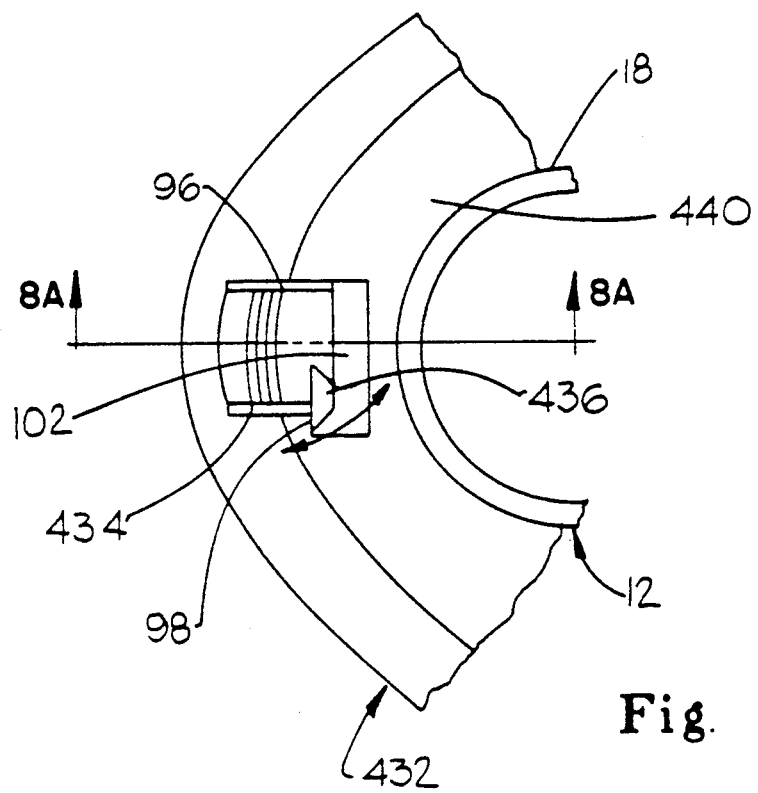
FIG. 8 is a simplified partial plan view of another package of the present invention.
Figure 8A:
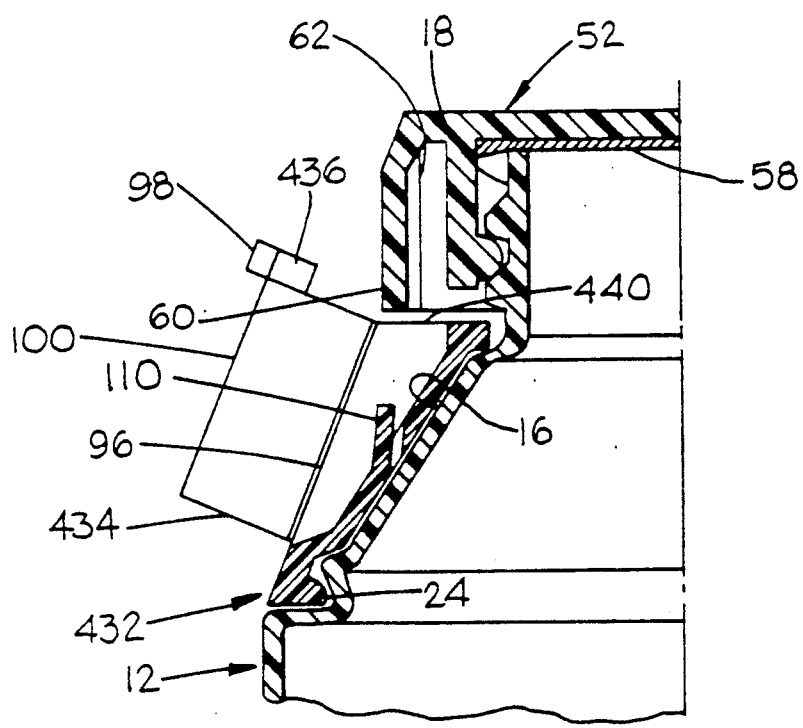
FIG. 8A is a simplified cross-section of the package shown in FIG. 8, said cross-section being taken at a point corresponding to section line 8A—8A of FIG. 8, but showing the pushtab in its as molded condition prior to folding for purposes of clarity.

FIGS. 8 and 8A show still another alternative to the hinged pushtab designs shown in FIGS. 5-7. In the collar embodiment 432 shown in FIG. 8, pushtab 434 can be connected to the collar along either of its side edges by means of a vertically extending hinge 96. A tapered projection 98 on a side edge 100 of pushtab 434 and vertical extension 436 engages a socket 102 integrally molded in the uppermost annular ring 440 of collar 432. As with collar 132, collar 432 preferably has pushtabs 434 molded in an outwardly extending position, as shown in FIG. 8A, for ease of molding. The pushtabs 434 are folded to their in-use position, as shown in FIG. 8, after the collar 432 has been removed from the mold. Actuation of pushtab 434 causes pivoting thereof about vertically extending hinge 96. This pivoting action of pushtab 434 causes a corresponding inward movement of vertical extension 436 to disengage from interlocking engagement with tooth 62 on the skirt 60 of closure 52.

A cantilevered beam spring 110, as shown in FIG. 8A, can also be integrally molded with collar embodiment 432 to act as a return spring for pivoting pushtab 434. As with cantilevered beam springs 82 and 90, cantilevered beam spring 110 can be molded to whatever shape, thickness, length, and position is desired to provide the desired pushtab return force, as discussed earlier in the present specification.

It should also be noted that while the closure 52 disclosed in FIG. 1 employs a double skirt, i.e., outermost skirt 60 and innermost skirt 54, the functionality of the closure would not be impaired if it employs only a single skirt which incorporates both the threads 56 needed to secure it to the finish portion 18 of bottle 12 and interlocking teeth 62 which prevent unscrewing of the closure unless the pushtabs are first depressed.

Similarly, while two pushtabs are illustrated in the package embodiments shown in the accompanying Drawing Figures, the present invention could also be practiced to advantage using only a single pushtab to afford child resistance. Alternatively, more than two pushtabs could be employed.

Finally, with respect to the design of vertical extensions 36 on pushtabs 34, it should be noted that the vertical height of extensions 36 is preferably sufficiently small that when closure 52 is rotated 180° (assuming two opposed pushtabs are employed) in the direction of closure removal after the pushtabs 34 have been depressed, the closure will rise sufficiently that it will no longer engage the pushtab vertical extensions. This avoids the need to depress the pushtabs more than one time on any given opening cycle.

Figure 9:
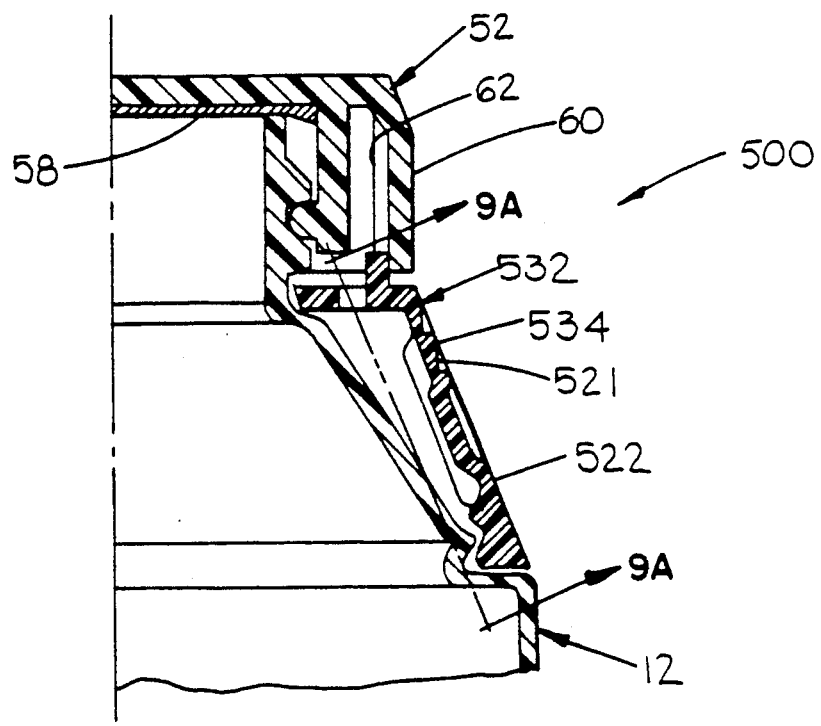
FIG. 9 is a simplified partial cross-section of another package of the present invention.
Figure 10:
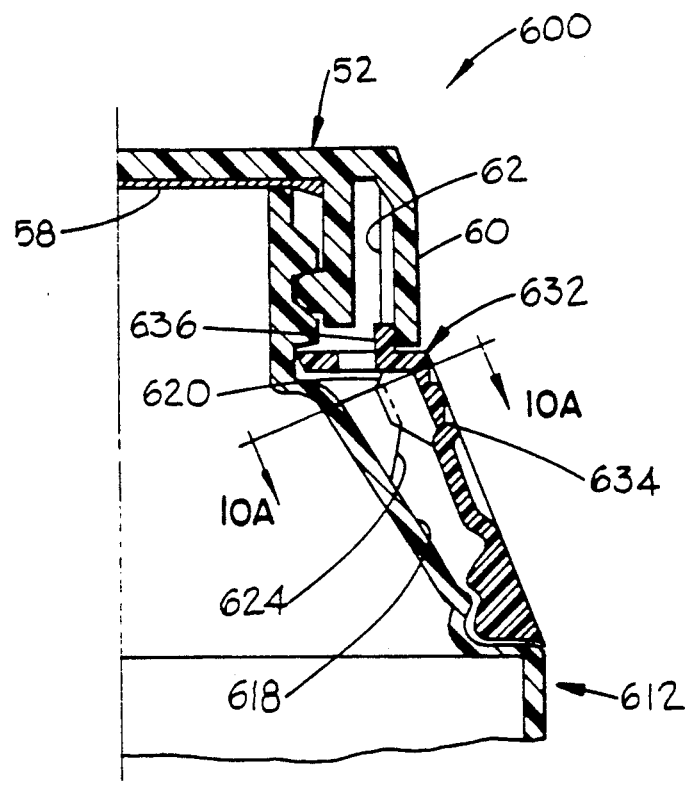
FIG. 10 is a simplified partial cross-section of another package of the present invention.

FIGS. 9-11 disclose alternative package embodiments of the present invention. These package embodiments include: (a) means for increasing the squeezing force required to depress the pushtabs; (b) means for preventing or at least minimizing lateral deflection of the cantilevered pushtabs when closure removal torque is applied without first depressing the pushtabs; or (c) both. Except as otherwise noted, the bottle and closure of package embodiments 500, 600 and 700 shown in FIGS. 9, 10 and 11, respectively, are the same as described previously in connection with package embodiment 100 shown in FIG. 1.

Figure 9A:
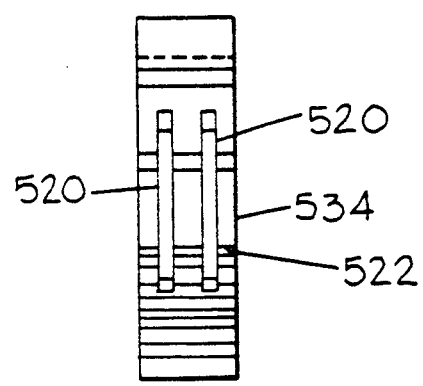
FIG. 9A is a view of the pushtab employed on the package shown in FIG. 9, said view being taken along view line 9A—9A of FIG. 9.

FIGS. 9 and 9A show an alternative design for pushtab 534 of collar 532. This design can be employed to increase the squeezing force required to depress the pushtabs. At least one stiffening rib 520 (two ribs 520 are illustrated) is added to the inner surface of pushtab 534. The rib 520 preferably extends from the movable end 521 of the pushtab to beyond the defined hinge 522. The rib or ribs 520 increase the bending stiffness of the pushtab 534 and effectively move the hingepoint below the defined hinge 522 to where the wall of collar 532 is typically somewhat thicker. This change increases the force required to depress each pushtab 534.

Figure 10A:
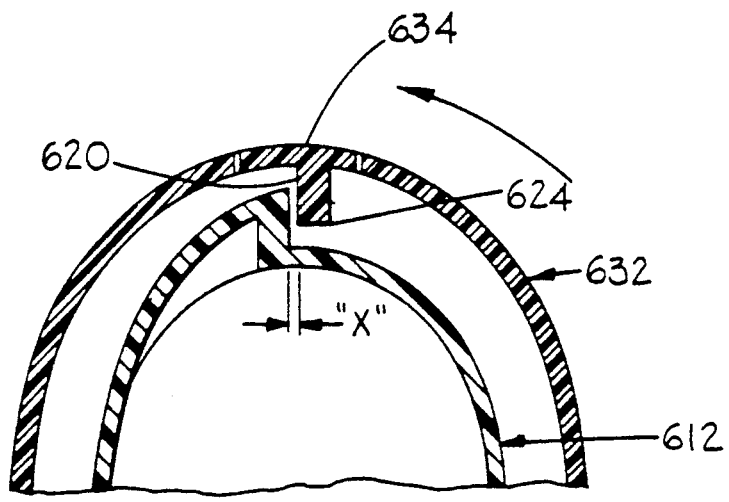
FIG. 10A is a simplified partial cross-section of the package shown in FIG. 10 taken through section line 10A—10A of FIG. 10.

FIGS. 10 and 10A show an alternative collar embodiment 632 which is designed to increase the package's resistance to removal torque when attempts are made to unscrew closure 52 without first depressing pushtabs 634. In collar embodiment 632 a short torque resisting rib 620 extends upwardly from the innermost surface of pushtab 634. Rib 620, in the fully assembled condition of the package 600, engages a radial projection 624 molded in or on bottle 612. The torque resisting rib 620 and bottle projection 624 contact one another when the pushtab 634 is bent laterally by closure removal torque which has been applied without depressing pushtabs 634. This removal torque is transmitted from pushtab extension 636 to pushtab 634 to bottle projection 624, which in turn helps to resist the applied removal torque.

When deformable materials such as polypropylene are employed as the collar and pushtab material, the pushtabs could be permanently deformed by excessive lateral deflection during attempts to remove closure 52 without depressing pushtabs 634. Therefore, to help prevent overstressing and permanently deforming pushtabs 634 in this manner, the assembled clearance (dimension "X" in FIG. 10A) between torque resisting rib 620 on pushtab 634 of collar 632 and bottle projection 624 is preferably about 0.01 inches or less. The depth of torque resisting rib 620 must, of course, be sufficiently small that pushtabs 634 can be depressed far enough to disengage pushtab vertical extensions 636 from the interlocking closure teeth 62 before the ribs 620 strike the shoulder portion 618 of the bottle 612. Otherwise, the sidewall of shoulder portion 618 must also be deformed to permit sufficient depression of pushtabs 634.

FIG. 11 shows still another package embodiment 700 of the present invention offering both increased depression resistance and increased torque resistance to pushtabs 34 on collar 32. In this latter package embodiment, which employs a bottle 12 and collar 32 identical to those of package 100 shown in FIG. 1, the closure 752 has a third skirt 726, which may extend 360° around the closure axis or only a portion thereof. Removal torque applied to closure 752 when pushtabs 34 are not depressed is, at least to a degree, resisted by retention of vertical pushtab extensions 36 between concentric closure skirts 760 and 726 as well as by interlocking teeth 762 on closure skirt 760. When the pushtab vertical extensions 36 are inwardly depressed, closure skirt 726 is deflected. The resistance to deflection of skirt 726 provides added depression resistance to pushtabs 34. As closure 752 is rotated after pushtabs 34 have been depressed, the localized deformation of closure skirt 726 progressively moves along the skirt as the closure rotates past the depressed vertical extensions 36 of pushtabs 34. This provides some additional resistance to removal of closure 752 from bottle 12 until such time as closure skirt 726 rises completely above the pushtab vertical extensions 36.

Figure 12:
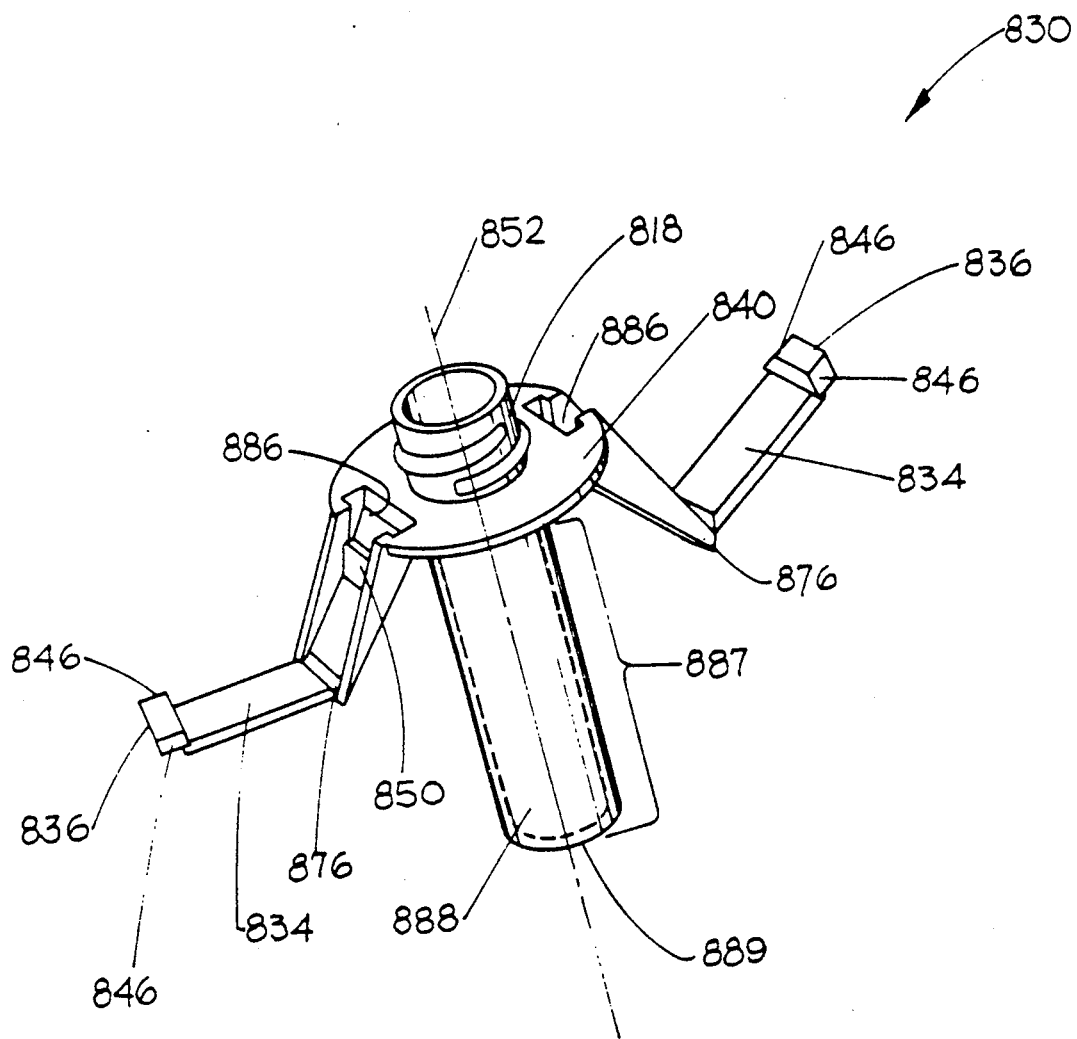
FIG. 12 is a simplified perspective view of an injection molded part which can be utilized to form the bottle and collar used in a particularly preferred embodiment of the present invention as a single piece.
Figure 13:
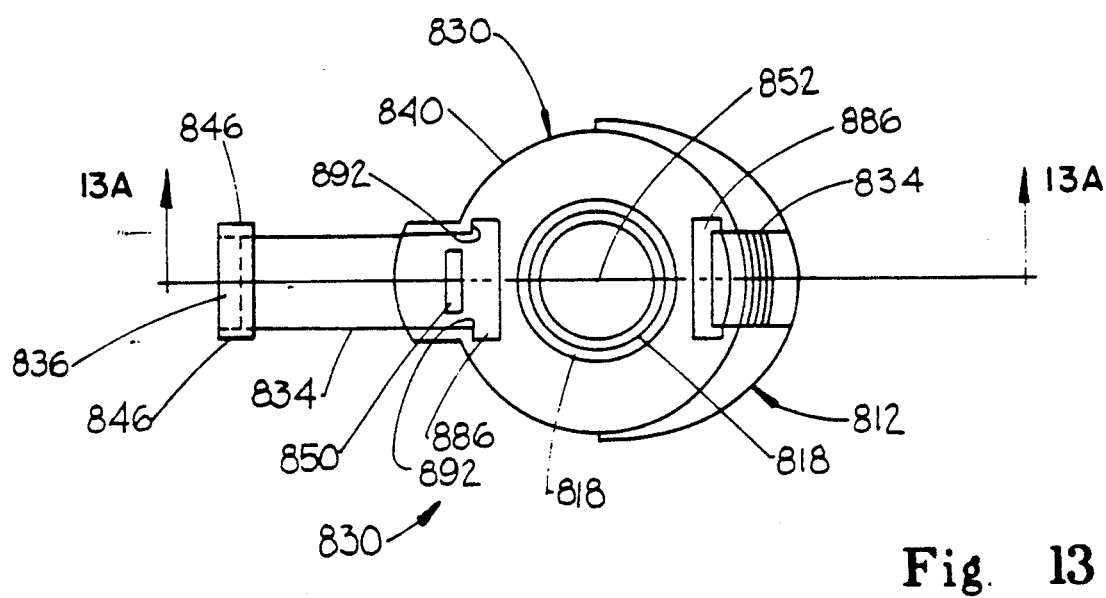
FIG. 13 is a simplified plan view of the injection molded part generally shown in FIG. 12, but illustrating the right hand portion of the bottle after the blow molding operation has been completed and the pushtab has been folded into its in-use position.
Figure 14:
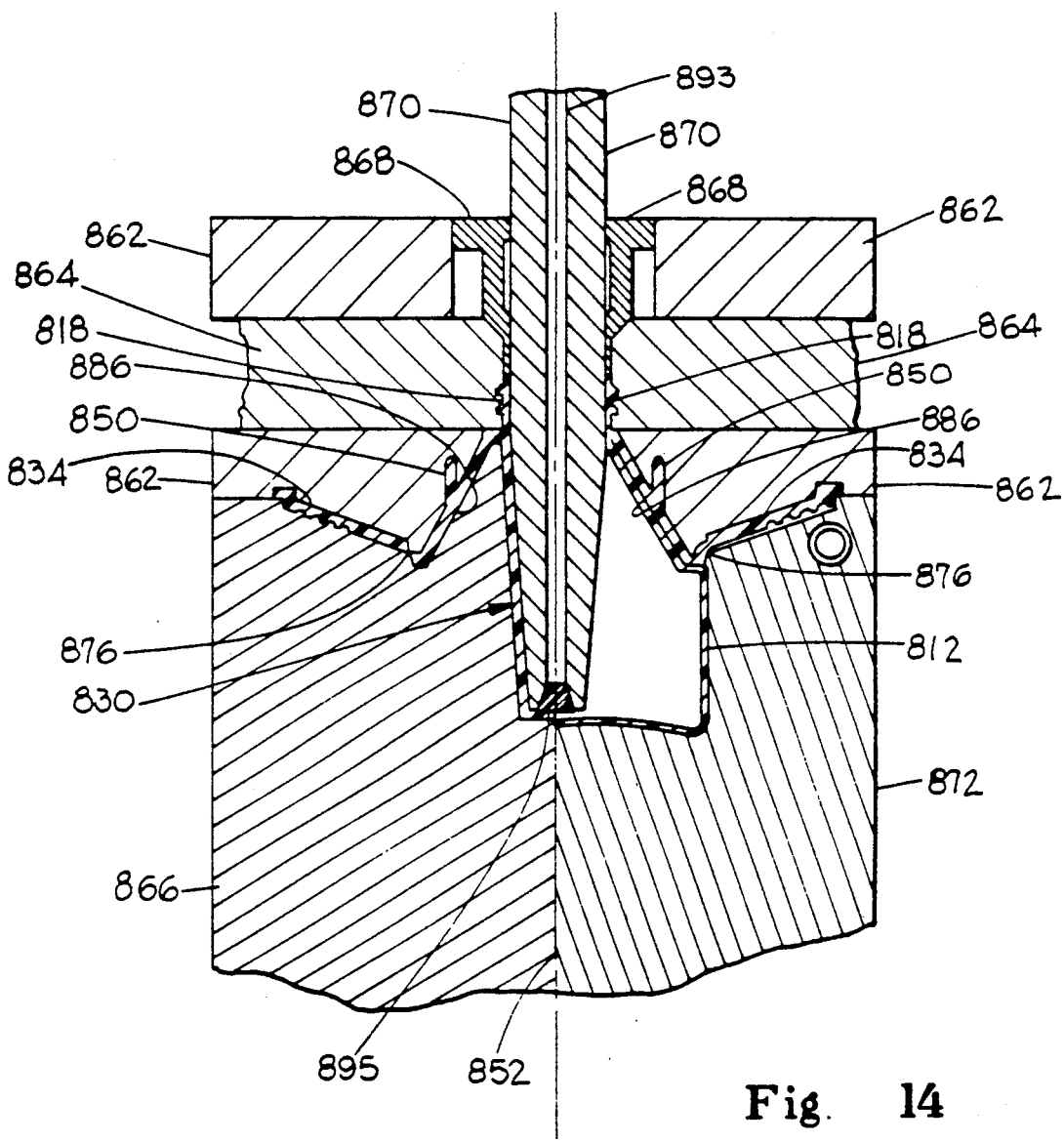
FIG. 14 is a view generally similar to that of FIG. 13A, but illustrating the conditions which exist when the elements utilized to mold the injection molded part (left hand side of centerline 852) and the finished bottle (right hand side of centerline 852) are present.

Still another package embodiment 800 of the present invention has the bottle 812 and collar 832 molded as one piece. This package embodiment is illustrated in FIGS. 12, 13 and 14. There is no change in closure 52 for this package embodiment.

FIG. 12 is a perspective view of the initially injection molded part 830, which comprises: finish portion 818; flange 840; angled sockets 886; hingedly connected pushtabs 834; and a bottle preform 887 comprising tube 888 and closed rounded end 889. Each of the hingedly connected pushtabs 834 has a vertical extension 836 at its free end, with a tapered locking projection 846 extending on each side of pushtab 834 and vertical extension 836.

Figure 13A:
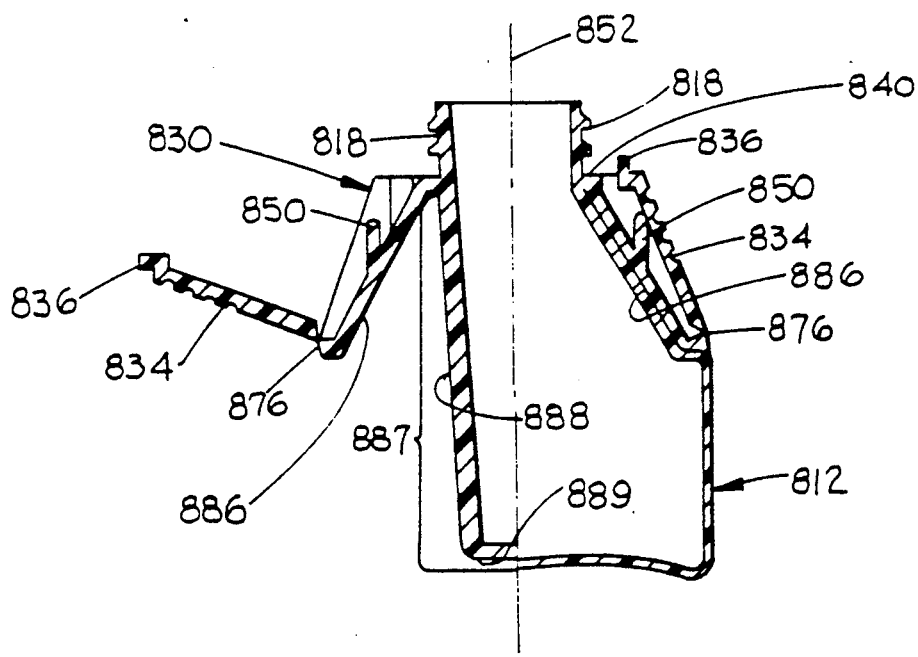
FIG. 13A is a simplified cross-section taken along section line 13A—13A of FIG. 13.

As can be seen from FIG. 12, finish portion 818 is an extension of tube 888, with flange 840 being concentric and intersecting finish portion 818 and tube 888. Each angled socket 886 has an opening just wide enough for pushtabs 834 to enter and a recess 892 for pushtab locking projections 846 to snap into. Each socket 886 also has a cantilevered beam spring 850 molded to the inside of its bottom surface, as generally shown in FIGS. 12, 13 and 13A. Each beam spring 850 extends upward toward flange 840 and contacts the innermost surface of a pushtab 834 when the pushtab is folded at its connecting hinge 876 and snapped into a socket 886. This pushtab/spring arrangement is functionally similar to the one generally shown in FIGS. 5–5D.

FIG. 13 is a split plan view showing a portion of the injection molded part 830 in the condition shown in FIG. 12 and a portion of the part after the preform portion of the part has been blow molded to form the combination bottle/collar. FIG. 13A is a cross-sectional view taken along section line 13A—13A of FIG. 13. To the left of centerline 852, in FIG. 13A there is shown the injection molded part 830 illustrated in FIG. 12. To the right of centerline 852 in FIG. 13A there is shown the one-piece bottle 812 formed by blow molding the preform portion 887 of injection molded part 830, rotating the pushtab 834 about its connecting hinge 876 and snapping the locking projections 846 into socket B86. The right hand portion of FIG. 13A is shown with the preform portion 887 in its fully expanded condition where it makes contact with the angled sockets 886 which are integrally formed with flange 840.

FIG. 14 is a split cross-sectional view generally similar to that of FIG. 13A, but showing the injection and blow molding components in position to illustrate how such a one-piece bottle collar combination can be manufactured.

In a particularly preferred manufacturing process, the injection molded part 830 is made using an upper die plate 862, horizontally retractable neck slide blocks 864 mounted within said upper die plate, lower die plate 866, stripper ring 868 and core pin 870. These elements are shown on the left side of centerline 852.

On the right side of centerline 852 are the blow mold components including: blow mold cavity 872 and common upper die plate 862, neck slide blocks 864, and stripper ring 868. The compressed air or other gas for blowing the preform 887 of injection molded part 830 into bottle 812 is delivered through conduit 893 in core pin 870, which has a check valve 895 schematically shown in its tapered end. For simplicity, the check valve 895 is shown in its fully closed position, as it would be for the injection molding step, in FIG. 14 and in its fully open position, as it would be for the blow molding step, in the inset of FIG. 14A.

Figure 14A:
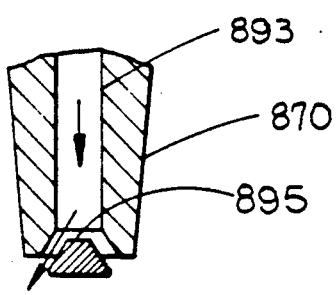
FIG. 14A is an inset of FIG. 14 depicting the condition of the check valve in the core pin 870 at the time compressed air is injected into the preform to cause the preform to assume the shape of the cavity of the bottle mold.

Thus, the aforementioned process is, in the illustrated embodiment, a two step process using common upper die parts mounted, for example, on an indexing table. After injection molding, lower die plate 866 is removed in a downward direction while neck slide blocks 864 remain closed to hold injection molded part 830 in contact with upper die plate 862. After indexing, blow mold cavity 872 is raised into position around the outside of preform 887. Check valve 895 in core pin 870 opens, as shown in the inset of FIG. 14A, and compressed air is preferably injected to expand the preform to the shape of the blow mold cavity 872. At the completion of blow molding cycle, blow mold cavity 872 is lowered, neck slide blocks 864 are retracted horizontally, and stripper ring 868 is actuated in a downward direction to strip the one-piece bottle/collar combination off core pin 870.

Finally, pushtabs 834 are rotated upwardly about hinges B76 and into sockets 886, with projections 846 locking into recesses 892 of sockets 886.

For some materials, such as polyester, an intermediate process step may be required between the injection molding and blow molding steps. That is, after injection molding, preform 887 may be allowed to cool before removing lower die plate 866 so that the relatively low melt strength of the material does not permit deformation of the injection molded part 830. Then, prior to blow molding the preform 887 comprising tube 888 and closed rounded end 889, the preform is reheated. This could be done at a second of three positions on an indexing table. A reheat die shaped to contact only preform 887 without contacting angled sockets 886 or outwardly hinged pushtabs 834 would conduct heat to the preform 887 from its outer surface. The reheat die would then be removed prior to indexing the injection molded part 830 to the blow molding station while the preform 887 is still in a heated condition. The blow molding operation would then be carried out in the manner described earlier herein.

It is believed that the package designs and processes described herein and their attendant advantages will be understood from the foregoing description. It will, of course, be apparent to those skilled in the art that various changes may be made in form, construction, and arrangement without departing from the spirit and scope of the invention, and it is intended to cover in the appended claims all such modifications that are within the scope of this invention.

What is claimed is:

1. A method for producing an integral bottle/collar combination for use in a package for storing and dispensing potentially dangerous material, said package being resistant to opening by children yet readily openable by adults, said method comprising the steps of:
   (a) injection molding a polymeric part comprising a finish portion, a preform portion comprising a tube having a closed rounded end continuously joined to the lowermost surface of said finish portion, a flange portion oriented substantially perpendicular to the axis of said finish portion and said preform portion and located at the area of joinder between said finish portion and said preform portion, said flange portion including at least one integrally formed socket having a resiliently deformable pushtab hingedly connected thereto at its lowermost end, said socket further including a cantilevered beam spring to impart depression resistance to said pushtab;

(b) blow molding said preform portion of said injection molded part into contact with said socket and into the shape of said bottle by injecting pressurized gas into said preform portion of said part while said preform is surrounded by a blow molding cavity having an internal configuration identical to that desired in said bottle, thereby forming said bottle/collar combination; and (c) folding said hingedly connected pushtab into its in-use position about said hinge after removal from said blow molding cavity, whereby said cantilevered beam spring in said socket imparts depression resistance to said folded, hingedly connected pushtab whenever an external force is applied thereto.

2. The method of claim 1 wherein said pushtab further includes at least one tapered locking projection, wherein said socket includes a recess which will accommodate said locking projection and wherein said pushtab is injection molded in an outwardly extending configuration oriented away from the socket to which it is hingedly connected and folded into its in-use position in said socket after said bottle/collar combination is removed from said blow molding cavity, whereby said tapered locking projection on said pushtab becomes engaged within said recess in said socket to prevent subsequent unfolding of said hingedly connected pushtab about said hinge.

3. The method of claim 1 including the step of reheating said preform portion of said injection molded part prior to injecting said pressurized gas therein.

4. The method of claim 3 wherein said polymeric material is comprised of polyester.

5. The method of claim 1 wherein a pair of said sockets are injection molded approximately 180° from one another on the periphery of said flange.

* * * * *

UNITED STATES PATENT AND TRADEMARK OFFICE
CERTIFICATE OF CORRECTION

PATENT NO. : 5,038,454

DATED : August 13, 1991

INVENTOR(S) : D.M. Thornock, J.R. Goldberg, R.W. Kock, R.A. Paul, P.W. Hamilton, W. Willhite, Jr.

It is certified that error appears in the above-identified patent and that said Letters Patent is hereby corrected as shown below:

Column 7, line 66, "o" should read -- on -- .

Column 11, line 50, "B86" should read -- 886 -- .

Column 12, line 28, "B76" should read -- 876 -- .

Column 12, line 65, "perform" should read -- preform -- .

Signed and Sealed this

Twenty-seventh Day of October, 1992

*Attest:*

DOUGLAS B. COMER

*Attesting Officer*  *Acting Commissioner of Patents and Trademarks*